(12) United States Patent
Balzer et al.

(10) Patent No.: US 7,374,412 B2
(45) Date of Patent: May 20, 2008

(54) EXTRUSION HEAD

(75) Inventors: Martin Balzer, Sankt Augustin (DE);
Willi Doehmen, Moenchengladbach (DE); Heinz-Werner Eckerskorn, Neunkirchen-Seelscheid (DE); Lutz Forst, Hennef (DE); Peter Kluesener, Bonn (DE); Roger Stehr, Duesseldorf (DE); Michael Pappert, Eitorf (DE)

(73) Assignee: Kautex Maschinenbau GmbH, Bonn (DE)

( * ) Notice: Subject to any disclaimer, the term of this patent is extended or adjusted under 35 U.S.C. 154(b) by 268 days.

(21) Appl. No.: 10/805,782

(22) Filed: Mar. 22, 2004

(65) Prior Publication Data
US 2004/0183224 A1 Sep. 23, 2004

(30) Foreign Application Priority Data
Mar. 20, 2003 (DE) ................. 103 12 522

(51) Int. Cl.
*B29C 47/06* (2006.01)
*B29C 47/22* (2006.01)

(52) U.S. Cl. .............. 425/133.1; 425/381; 425/462; 425/465; 425/466; 425/467

(58) Field of Classification Search ............. 425/133.1, 425/381, 462, 465, 466, 467
See application file for complete search history.

(56) References Cited

U.S. PATENT DOCUMENTS

| 4,134,952 | A | * | 1/1979 | Yoshikawa et al. | 264/171.26 |
| 4,802,833 | A | * | 2/1989 | Shapler | 425/131.1 |
| 4,874,305 | A | * | 10/1989 | McGill et al. | 425/131.1 |
| 4,890,994 | A | * | 1/1990 | Shapler et al. | 425/131.1 |
| 5,204,120 | A | * | 4/1993 | Hirschberger | 425/132 |
| 5,221,540 | A | * | 6/1993 | Hirschberger | 425/131.1 |
| 5,460,772 | A | * | 10/1995 | Ohta | 264/515 |
| 5,464,107 | A | | 11/1995 | Koeniger | |
| 6,764,639 | B1 | * | 7/2004 | Richter | 264/515 |

FOREIGN PATENT DOCUMENTS

| EP | 0 491 093 A1 | 6/1992 |
| EP | 0 575 039 A1 | 12/1993 |
| WO | WO9808668 | 3/1998 |
| WO | 02/085602 A1 | 10/2002 |

OTHER PUBLICATIONS

EPO Search Report dated Jul. 7, 2004, received in co-pending EPO Application No. 04002867.2, 3 pgs.

* cited by examiner

*Primary Examiner*—Robert B. Davis
*Assistant Examiner*—Joseph Leyson
(74) *Attorney, Agent, or Firm*—Grossman Tucker Perreault & Pfleger, PLLC

(57) ABSTRACT

In an extrusion head and an extrusion method for the production of a tubular multilayer preform the extrusion head includes at least two feed paths for feeding plasticised plastic material from one or more extruders to an annular passage arrangement. The annular passage arrangement includes mutually concentric annular passages forming mutually separate flow paths for the various layers of the preform. An annular gap nozzle has an annular gap communicating with the annular passage arrangement, and at least one flow passage communicates with an annular passage of the annular passage arrangement, for the introduction of a translucent viewing strip. The flow passage communicates with the annular passage in question upstream of the annular gap in the region of separation of the flow paths.

7 Claims, 3 Drawing Sheets

EXTRUSION HEAD

CROSS-REFERENCES TO RELATED APPLICATIONS

This application claims the priority of German patent application Serial No 103 12 552.1 of Mar. 20, 2003, the subject-matter of which is incorporated herein by reference.

FIELD OF THE INVENTION

The invention concerns an extrusion head and more particularly an extrusion head for the production of a tubular multilayer preform of softened thermoplastic material having at least one viewing strip of translucent material extending in the extrusion direction.

The invention further concerns a method of extruding a tubular multilayer preform of softened thermoplastic material.

BACKGROUND OF THE INVENTION

One form of an extrusion head for the production of a tubular multilayer preform of softened thermoplastic material, with at least one translucent strip extending in the extrusion direction, which strip can serve for example for visually checking the content of a container produced from the preform, comprises at least two feed paths for feeding plasticised plastic material from a plurality of extruders to an annular passage arrangement. Arranged downstream of the annular passage arrangement is an extrusion nozzle having an annular slot or gap communicating with the annular passage arrangement, possibly with the interposition of an annular storage space. For the sake of brevity and convenience the nozzle having an annular gap or slot will be referred to hereinafter as an annular gap nozzle. The extrusion head further has at least one flow passage bore which opens into the annular passage arrangement, for introducing thereinto the translucent material for forming the viewing strip. In relation to such a piece of equipment reference may be made for example to WO 98/08668 describing an apparatus including an extrusion head of the above-indicated kind, for producing a drum-like container of plastic material with a viewing strip of translucent plastic material, which extends in the axial direction of the container in the wall thereof.

In quite general terms the production of plastic containers using an extrusion blow molding process, with a viewing strip extending in the longitudinal direction thereof, is a known procedure, more specifically both in relation to containers of a single-layer structure and also containers of a multilayer structure. In the case of single-layer containers produced by an extrusion blow molding procedure, a strip of translucent material or a material of a different color from the rest of the container is usually introduced in the extrusion head by way of a flow passage bore extending transversely with respect to the direction of extrusion of the container material through the extrusion head. That manner of introducing the translucent material for the viewing strip involves dividing the extrudate to open it in the extrusion head, thereby producing separate flow portions. Downstream of the location at which the viewing strip material is introduced into the extrusion head the flow portions are brought back together again, and the materials are welded together in a molten condition.

The axially extending weld seams which are produced in that way between the various flow portions of the extrudate are weak points in the finished container, but these can be perfectly well accepted when dealing with small and light packs.

However it is not only in relation to small containers that a visual check on the level of the contents in the container is often desirable. Such a need to check the level of the container content may arise for example in relation to intermediate bulk containers, referred to as IBCs, and drums.

Checking the filling level of the material in the container does not give rise to any problem if the containers are made from a more or less translucent material. Often however it is necessary, as in WO 98/08668, for such drum containers to be provided with a coloration effect which serves for example to afford protection from UV radiation or which is intended to make the drum electrically conductive as protection from electrostatic charges. Such containers are usually produced with a multilayer wall, in which case it is only the outer, generally thinner layer that has such a coloration effect.

In order to ensure visual checking of the level of the contents of such drums, WO 98/08668 provides that a viewing strip of translucent material is disposed only in the outer colored layers of the co-extruded container. This has the advantage in particular that there is no need to divide the extrudate into separate parts, in the region of the inner layer of the container, which imparts stability to the container.

WO 98/08668 involves the use of a storage head with an annular storage space which enlarges in a funnel shape. The piston of the storage head has three annular distributors which are each connected to a respective extruder, involving different molten plastic materials. The annular distributors communicate with an annular passage which is disposed upstream of the nozzle and more specifically the nozzle gap, with the extrudates being brought together in the annular passage. The translucent molten plastic material is fed into that annular passage by way of a flow channel bore, below the mouth opening of all the annular dividers, more specifically in such a way that the viewing strip of translucent material passes through only the two outer layers of the total of three layers making up the co-extrudate. Those two outermost layers comprise an outer colored layer and an inner layer of recycled material. The feed of translucent material occurs by way of a flow body which extends at least as far as the molten plastic material forming the inner layer of the preform that is to constitute the finished container.

It will be noted that the above-described arrangement suffers from the disadvantage that it is not possible to exactly fix the layer boundary of the translucent viewing strip in relation to the three-layer structure of the extrudate. In order to ensure that the molten translucent plastic material passes completely through the two outer layers, it is necessary under some circumstances for the flow body to be so positioned, directed radially inwardly in relation to the longitudinal axis of the extrusion head, that the extrudate forming the inner layer also flows around the flow body, even if only to a slight degree. It will be appreciated that this signifies a reduction in the wall thickness of the inner layer, which is closed in itself, in that region, and such a reduction in wall thickness thus entails a loss of stability of the container overall.

If the flow body does not extend entirely through both outer layers, the quality of the viewing strip suffers as a consequence. It is scarcely possible, or is a rather random matter, for the flow body to be caused to extend exactly into the plane of separation between the inner and outer layers. The above-described apparatus configuration is particularly disadvantageous if the thickness of the various layers of the preform is to be altered or varied. In that case it is necessary to adapt the depth of penetration of the flow body into the material according to the respective circumstances involved.

SUMMARY OF THE INVENTION

An object of the present invention is to provide an extrusion head which is capable of avoiding the disadvantages outlined above.

A further object of the present invention is to provide an extrusion head for producing a tubular multilayer preform with at least one viewing strip incorporated therein, which can provide a strong stable structure with accurate positioning of the viewing strip.

Yet another object of the present invention is to provide an extrusion head for producing a multilayer preform incorporating at least one viewing strip, which is such as not to at least seriously impair the structural integrity of the resulting product.

Still a further object of the present invention is to provide a method of extruding a tubular multilayer preform with a viewing strip incorporated therein, in which the layer boundary of the viewing strip can be exactly defined in relation to the other layers of the preform.

Yet a further object of the invention is to provide a method of extruding a multilayer preform with a viewing strip therein, which permits greater versatility in the operating procedure.

In accordance with the principles of the invention in the aspect relating to the extrusion head the foregoing and other objects are attained by an extrusion head for the production of a tubular multilayer preform of softened thermoplastic material with at least one viewing strip of translucent material extending in the extrusion direction, comprising at least first and second feed paths for a feed of plasticised plastic material from a plurality of extruders to an annular passage arrangement. An annular gap nozzle has its annular gap communicating with the annular passage arrangement, optionally with the interposition of an annular storage space, while at least one flow passage bore opens into the annular passage arrangement for introducing the viewing strip material therein. The annular passage arrangement includes a plurality of annular passages which are arranged in mutually concentric relationship and which form the mutually separate flow paths for the various layers of the multilayer preform. The flow passage bore opens upstream of the annular gap and/or the optional annular storage space in the region of separation of the flow paths into the annular passage in question.

In a preferred feature of the invention the extrusion head includes a flow divider and the flow passage bore communicates with the annular passage by way of the flow divider.

Particularly if the extrusion head is to be used to extrude a preform which is of a triple-layer configuration in cross-section, a preferred feature of the invention provides that the flow divider is arranged in an outer annular passage, more specifically in such a way that it causes complete division in the axial direction of the extrudate flowing through that outer annular passage.

In a preferred feature of the invention the annular passages communicate directly with the annular gap of the annular gap nozzle.

Alternatively however an annular storage space may be operatively disposed upstream of the annular gap and the annular passage arrangement may be in the form of part of an annular piston. In other words, the extrusion head according to the invention can be designed both as a storage head for discontinuous extrusion and also as an extrusion head for continuous extrusion.

In another preferred feature of the invention the annular passage arrangement can have first, second and third annular passages comprising an inner annular passage and first and second outer annular passages, wherein the outer annular passages are brought together upstream of the opening of the inner annular passage into the annular gap nozzle.

Further in accordance with the invention, in the method aspect, the foregoing and other objects are attained by a method of extruding a tubular multilayer preform of softened thermoplastic material with at least one strip of a different plastic material extending in the extrusion direction, wherein, in an extrusion head, a plurality of layers of the thermoplastic plastic material are passed by way of a part of the extrusion path in mutually concentric relationship by way of mutually separate flow paths. The material for forming the strip is fed into an outer layer upstream of the location at which the co-extruded flow portions are brought together.

Preferably, the strip of different material is of a translucent plastic material for constituting a viewing strip in the article produced from the preform.

It may be noted at this point that the term translucent in accordance with the invention is used to denote both materials which are at least virtually completely transparent and also materials which permit the passage of light but in somewhat diffuse manner.

In a preferred feature of the method of the invention an inner carrier layer and first and second outer cover layers are co-extruded, with the strip of translucent material being introduced in such a way that it at least partially passes through only the cover layers. The expression at least partially in this context in accordance with the invention means that for example, when the article produced has a plurality of cover layers, only that cover layer which is for example colored, that is to say in that case the outermost color layer, has the viewing strip passing therethrough.

Further objects, features and advantages of the invention will be apparent from the description hereinafter of preferred embodiments thereof.

DESCRIPTION OF PREFERRED EMBODIMENTS

Reference will first be made to FIGS. 1 through 4 illustrating a first embodiment of an extrusion head according to the invention for the production of a tubular multilayer preform of softened thermoplastic material with at least one viewing strip of translucent material extending in the extrusion direction, for example visual checking of the content of an article such as a container produced from the preform.

Figure 1:
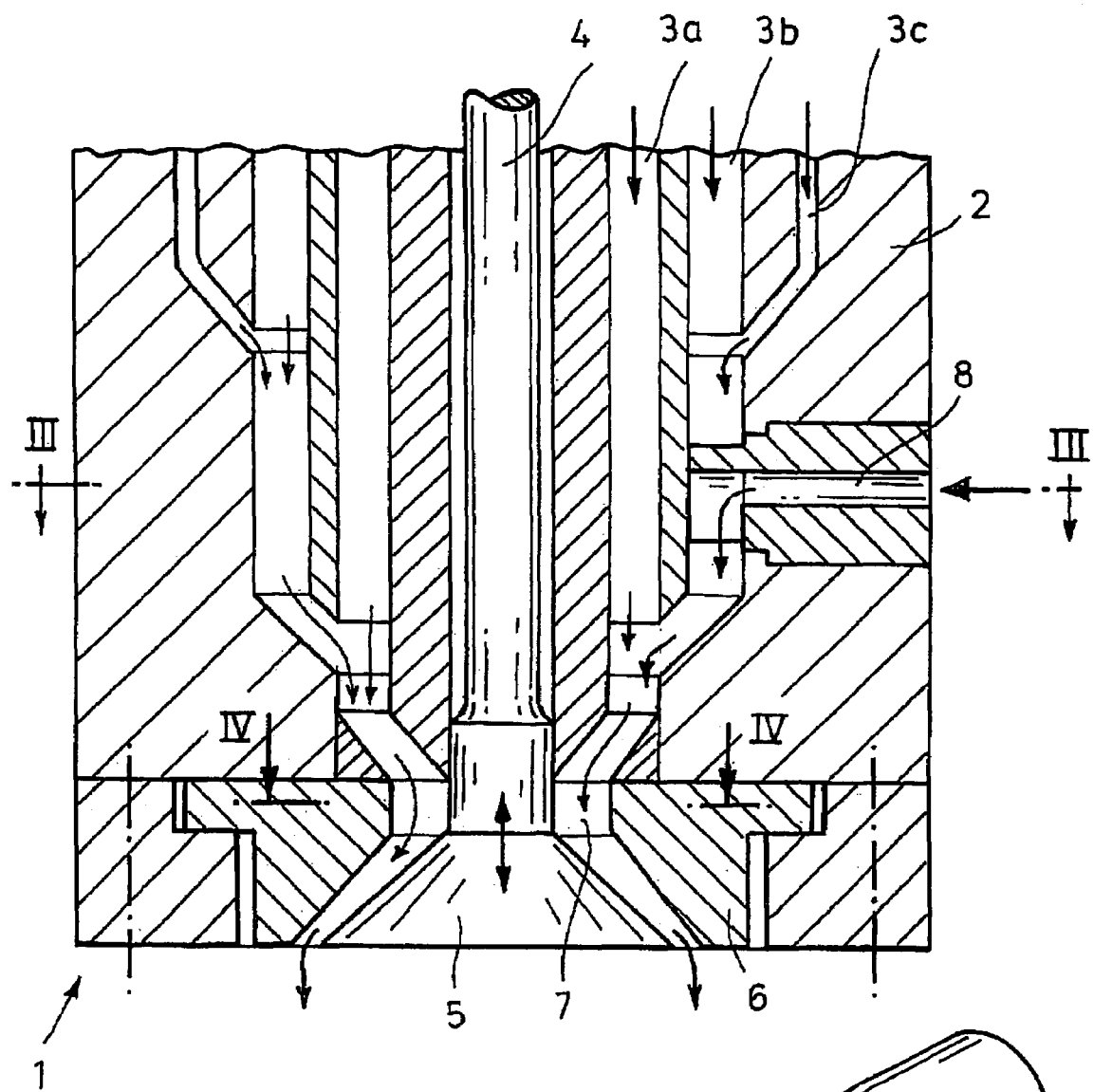
FIG. 1 is a partly sectional view of an extrusion head according to the invention.

Looking more specifically at FIG. 1, shown therein is a partly sectional view of part of the extrusion head 1 according to the invention. In the usual fashion in this respect the extrusion head 1 comprises a housing generally indicated at 2, an annular passage arrangement in the housing 2 and including an inner annular passage 3a and first and second outer annular passages 3b and 3c which are each fed with material from different extruders (not shown). Reference 4 denotes a bar with a nozzle head 5 of generally frustoconical shape and a nozzle casing 6 which, in conjunction with the nozzle head 5, forms an adjustable annular gap 7 of this annular gap extrusion nozzle structure. The bar 4 is axially displaceable and therewith also the nozzle head 5 within the nozzle casing 6, whereby ultimately the width of the annular gap 7 is adjustable in the conically enlarging region of the nozzle between the nozzle head 5 and the nozzle casing 6, during the extrusion procedure, in accordance with a predetermined program for controlling or adjusting the wall thickness of the preform extruded from the extrusion head.

The flow paths followed by the softened extrudate which passes through the extrusion head 1 are indicated by arrows in FIG. 1. As considered in the direction of flow of the extrudate through the extrusion head 1, firstly the annular passages 3b and 3c are brought together, and then, at a further downstream position, when entering the annular gap 7, the combined flow portions flowing from the annular passages 3b and 3c on the one hand and the flow portion flowing through the inner annular passage 3a on the other hand are brought together. The extrudate forming the inner carrier layer of a preform to be extruded from the extrusion head 1 is passed through the inner annular passage 3a.

Reference numeral 8 in FIG. 1 denotes a flow passage bore which opens into the annular passage 3b downstream of the location at which the passages 3b and 3c come together. The flow passage bore 8 extends transversely with respect to the extrusion direction through the extrusion head 1. A translucent plastic material is fed by way of the flow passage bore 8 into the annular passage 3b downstream of the mouth opening of the annular passage 3c into the annular passage 3b. The translucent material forms a strip extending over the entire thickness and, as viewed in the peripheral direction, over a small circular arc portion, of the outer layers of the extrudate, identified by 10b and 10c in FIGS. 3 and 4. Reference 10a in FIGS. 3 and 4 denotes the carrier layer of the extrudate.

Figure 4:
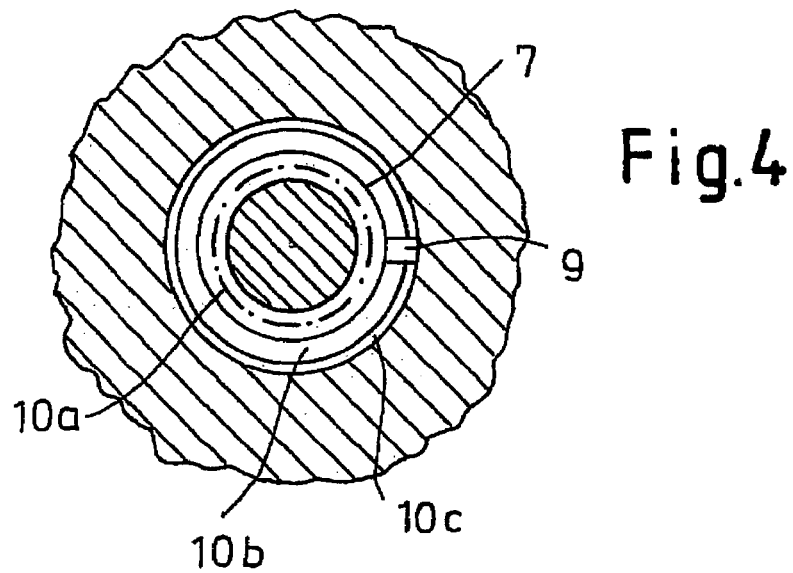
FIG. 4 is a view in section through the extrusion head of FIG. 1 taken along line IV-IV in FIG. 1.

As noted above, and as can be particularly clearly seen from FIG. 1, the material forming the translucent strip indicated at 9 in FIG. 4 is introduced through the flow passage bore 8 downstream of the convergence of the annular passages 3b and 3c and thus downstream of the position at which the layers 10b and 10c which are fed through the annular passages 3b and 3c are brought together.

Figure 2:
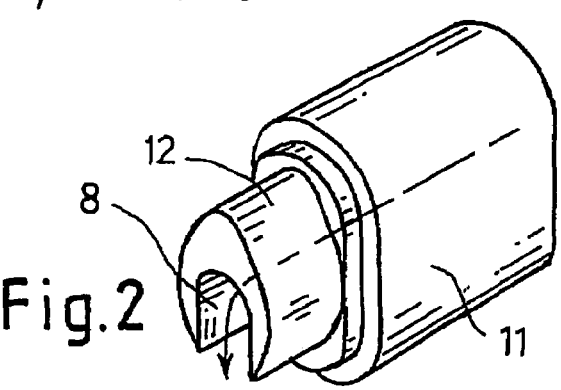
FIG. 2 is a perspective view of a flow divider of the FIG. 1 structure.

Referring now to FIG. 2, shown therein is a flow divider 11 through which the flow passage bore 8 extends. The flow divider 11 has an extension portion 12 of a generally roof-shaped configuration in cross-section transversely with respect to the flow passage bore 8. It will be seen from FIG. 1 that the flow divider 11 is fitted into an opening in the housing 2 of the extrusion head, in such a way that the extension portion 12 extends into the flow passage 3b, as illustrated until the end face thereof comes into contact with the wall of the flow passage 3b, in opposite relationship to the opening in the housing 2 in which the flow divider 11 is fitted. The extension portion 12 with its generally roof-shaped configuration thus provides an apex which is disposed above the mouth opening of the flow passage bore 8 and which faces upwardly in FIG. 1, that is to say in opposite relationship to the flow of softened thermoplastic material through the flow passage 3b. The extension portion 12 is thus operable to divide the flow of material which has originated from the upper part of the flow passage 3b and from the flow passage 3c and which have been brought together below the point of convergence thereof to constitute the adjoining layers 10b and 10c indicated in FIGS. 3 and 4.

It will be appreciated therefore that the translucent material issuing from the flow passage bore 8 flows into the space defined by the division of the material flowing downwardly through the flow passages 3b and 3c.

In this embodiment of the invention the carrier layer 10a comprises a non-colored plastic material, the layer 10b comprises a recycled material, for example processed batch material, while the layer 10c comprises a plastic material which for example is filled with black and thus colored. The recycled material is also not translucent or transparent.

Figure 3:
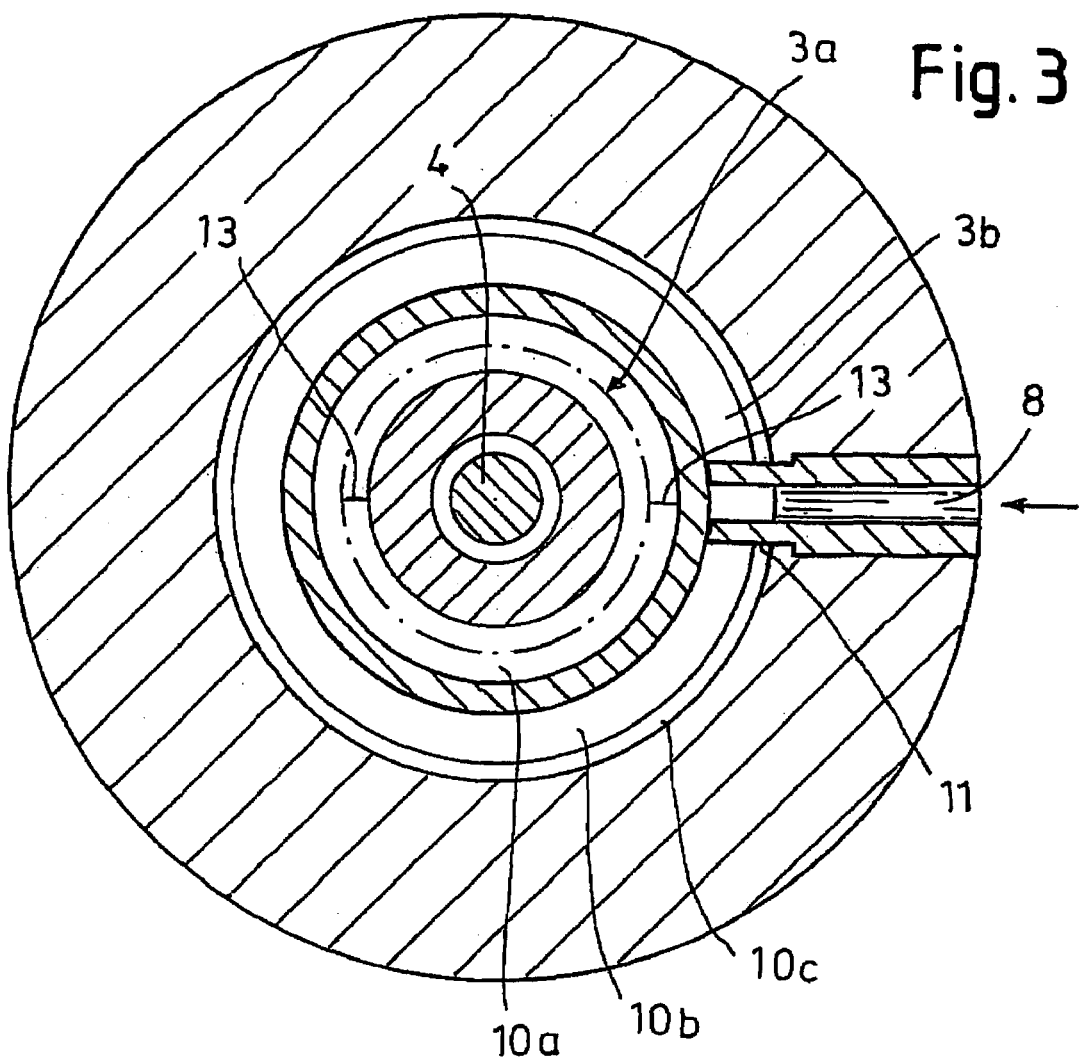
FIG. 3 is a view in section through the extrusion head of FIG. 1 taken along line III-III in FIG. 1.

Looking at FIGS. 3 and 4, as is illustrated by way of indication therein the carrier layer 10a is in turn composed of two flows of molten material which however are fed from the same extruder. That is due to the fact that the holder (not shown) for the bar 4 is provided for example with two heart-shaped guides displaced through 180° for the molten material, thereby forming two part-tubular flows. The points of convergence of those flows are indicated by reference 13 in FIG. 3 and are in mutually diametrally opposite relationship. The two flows are each overlapped by a melt extrusion portion which is not divided. That imparts to that layer a high level of strength in the finished article.

It will be appreciated that division of the flow of molten material is something that cannot be avoided in an extrusion head with a bar-holding device, such an arrangement often being referred to as an axial-flow feed head. It will also be noted that, when using a radial-flow feed head, it is also not possible to avoid the formation of a seam location when the molten material flows around the bar or the spindle.

Figure 5:
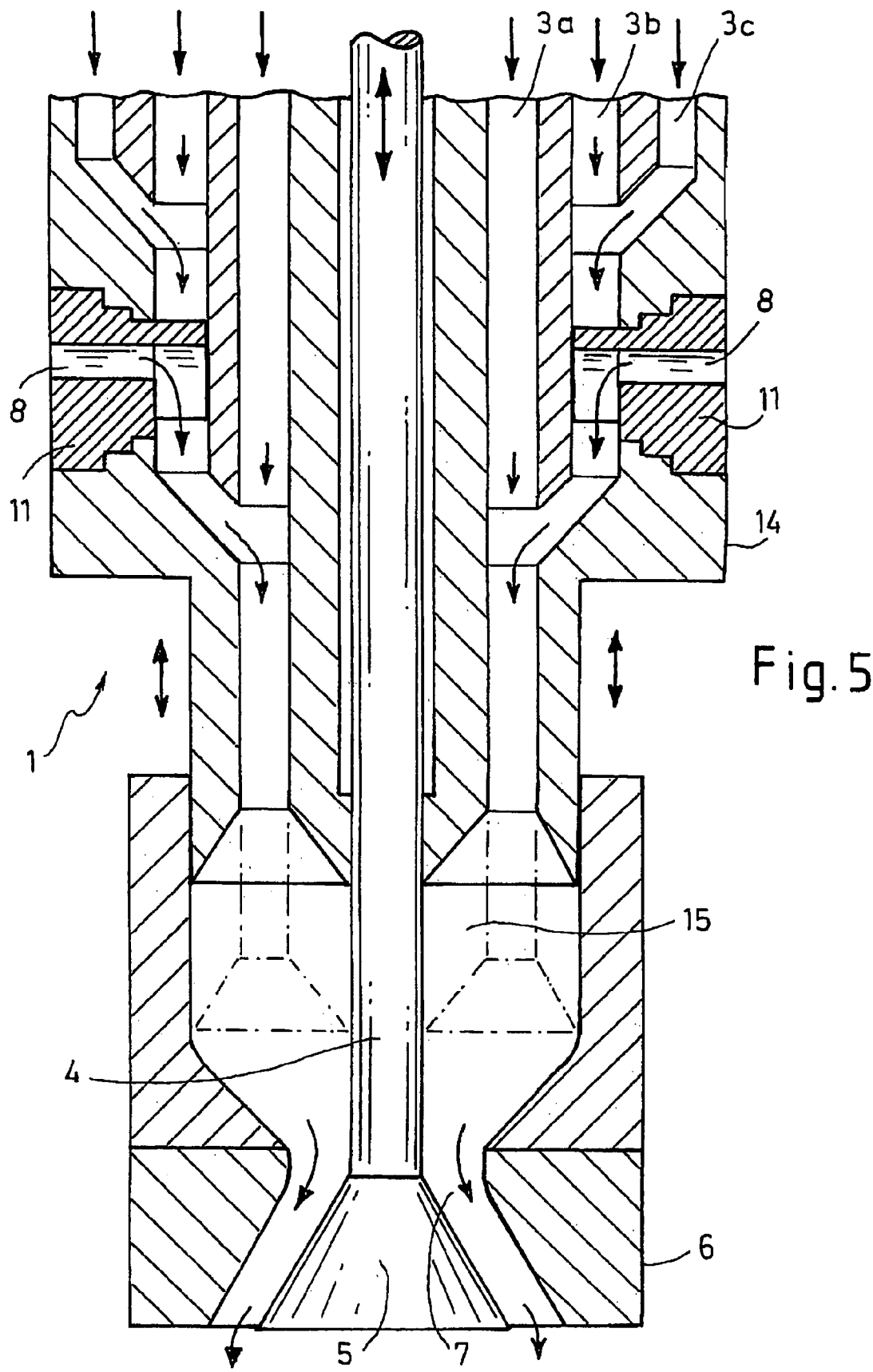
FIG. 5 is a view in section through an extrusion head in accordance with a second embodiment of the invention.

Reference will now be made to FIG. 5 showing a further embodiment of the invention in which the extrusion head 1 is in the form of a storage head. In this case, the annular passage arrangement is part of an annular piston which is identified generally by reference numeral 14 and which forms the upper termination of an annular storage space indicated generally at 15. The annular piston 14 is reciprocatable vertically in FIG. 5 between the extended condition shown in solid lines, and a retracted condition in which the lower end parts thereof assume the positions indicated by dash-dotted lines in FIG. 5.

The extrudate issuing from the annular passages 3a, 3b and 3c of the annular passage arrangement firstly passes into the annular storage space 15 and there produces an increase in pressure which causes an upward movement of the annular piston 14 at least towards the position shown in solid lines in FIG. 5. During that cycle the annular gap nozzle 7 formed by the components 5 and 6 is closed if necessary. The extruder conveys material into the annular storage space 15. When the annular storage space 15 is filled, the annular storage space 15 is actively emptied with the extrusion nozzle 5, 6 and 7 being opened, by way of an axial displacement of the annular piston 14 downwardly in FIG. 5 from the position shown. While that is happening the extruders continue to operate.

It will be noted that these operating processes are generally known and are only described here briefly for the sake of completeness.

It will also be noted that components in FIG. 5 which are identical to or which operatively correspond to those shown in FIGS. 1 through 4 are denoted by the same references, and that the otherwise general structure of the arrangement shown in FIG. 5 corresponds to that of the first embodiment described above.

It will be seen from FIG. 5 however that the embodiment illustrated therein has two diametrally opposite flow passage bores 8 for producing two strips 9 of translucent material extending in the extrusion direction in the tubular multilayer preform of softened thermoplastic material produced with this extrusion head.

The extrusion heads according to the invention as described hereinbefore have the advantage that the material forming the viewing strip can be introduced, without adversely affecting the extrudate material forming the inner carrier layer, in such a way that the viewing strip extends over the entire thickness of one or more outer layers of the preform and the article produced therefrom. That is guaranteed by virtue of the fact that the flow passage bore or bores 8 open into the annular passage arrangement 3a, 3b and 3c upstream of the annular gap 7 at which the flow portions constituting the extrudate are brought together. When the extrudates are brought together in the region of the nozzle, that is to say in the region of the annular gap 7, the viewing strip of translucent material has already been fed into the outer layer or layers.

It will be appreciated that the above-described embodiments of the invention have been set forth solely by way of example and illustration of the principles thereof and that various other modifications and alterations may be made therein without thereby departing from the spirit and scope of the invention.

What is claimed is:

1. An extrusion head for the production of a tubular multilayer preform of softened thermoplastic material with at least one viewing strip of translucent material extending in the extrusion direction, comprising an annular passage arrangement including a plurality of annular passages in mutually concentric relationship and forming mutually separate flow paths for material forming the various layers of the multilayer preform, at least two feed paths for feeding plastic material from at least one extruder to the annular passage arrangement, an annular gap nozzle having an annular gap communicating with the annular passage arrangement, and at least one flow passage radially opening into an annular passage of the annular passage arrangement for introducing material forming the viewing strip, the flow passage opening upstream of the annular gap in the region of separation of the flow paths, said flow passage being provided by a flow divider, the flow divider including a flow passage bore which extends transversely therethrough with respect to the extrusion direction and which establishes flow passage communication with said annular passage.

2. An extrusion head as set forth in claim 1 including an annular storage space operatively interposed between the annular passage arrangement and the annular gap of the annular gap nozzle, the flow passage radially opening into said annular passage upstream of the storage space.

3. An extrusion head as set forth in claim 1 wherein said flow divider includes an extension portion and an opening for said flow passage bore, including a roof disposed above said opening.

4. An extrusion head as set forth in claim 3 wherein the annular passage arrangement includes an outer annular passage, and the flow divider is arranged in the outer annular passage operably to effect complete division in the axial direction of the extrudate flowing through said outer annular passage.

5. An extrusion head as set forth in claim 1 wherein the annular passages communicate directly with the annular gap of the annular gap nozzle.

6. An extrusion head as set forth in claim 2 wherein said annular storage space is operatively disposed upstream of said annular gap and including an annular piston in which the annular passage arrangement is provided.

7. An extrusion head as set forth in claim 1 wherein the annular passage arrangement has first, second and third annular passages comprising an inner annular passage and first and second outer passages, wherein the outer annular passages are brought together upstream of the opening of the inner annular passage into the annular gap nozzle.

* * * * *